(12) United States Patent
Miyagawa et al.

(10) Patent No.: US 9,077,927 B2
(45) Date of Patent: Jul. 7, 2015

(54) IMAGE INSPECTION SYSTEM AND IMAGE INSPECTION METHOD FOR DETERMINING A THRESHOLD USEABLE FOR DEFECT DETECTION IN A SCANNED IMAGE BASED UPON A REFERENCE IMAGE WITH AN ARTIFICIAL DEFECT

(71) Applicants: Hiromitsu Miyagawa, Tokyo (JP); Tadashi Kitai, Kanagawa (JP)

(72) Inventors: Hiromitsu Miyagawa, Tokyo (JP); Tadashi Kitai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/952,782

(22) Filed: Jul. 29, 2013

(65) Prior Publication Data
US 2014/0036290 A1 Feb. 6, 2014

(30) Foreign Application Priority Data

Aug. 2, 2012 (JP) .................................. 2012-171946
Jul. 22, 2013 (JP) .................................. 2013-151922

(51) Int. Cl.
*H04N 1/40* (2006.01)
*H04N 1/00* (2006.01)

(52) U.S. Cl.
CPC ............. *H04N 1/40* (2013.01); *H04N 1/00015* (2013.01); *H04N 1/00031* (2013.01); *H04N 1/00047* (2013.01); *H04N 1/00063* (2013.01); *H04N 1/00082* (2013.01)

(58) Field of Classification Search
None
See application file for complete search history.

(56) References Cited

U.S. PATENT DOCUMENTS

2012/0121139 A1* 5/2012 Kojima et al. ................ 382/112

FOREIGN PATENT DOCUMENTS

JP 2008-003876 1/2008
JP 2011-122985 6/2011

* cited by examiner

*Primary Examiner* — Jeremiah Bryar
(74) *Attorney, Agent, or Firm* — Harness, Dickey & Pierce, P.L.C.

(57) ABSTRACT

An image inspection system for inspecting an image output on a recording medium includes an image forming unit to form a threshold setting image on the recording medium; an image scanner to scan the threshold setting image to generate a scanned image; an inspection reference image generator to generate an inspection reference image using data of the an output-target image; an image inspection unit to determine a defect in the scanned image based on a difference between the inspection reference image and the scanned image; and a threshold determiner to determine a threshold to be compared with the difference between the inspection reference image and the scanned image. The image inspection unit computes the difference between the scanned image and the inspection reference image. The threshold determiner determines a threshold to be compared with the difference between the scanned image and the inspection reference image.

15 Claims, 11 Drawing Sheets

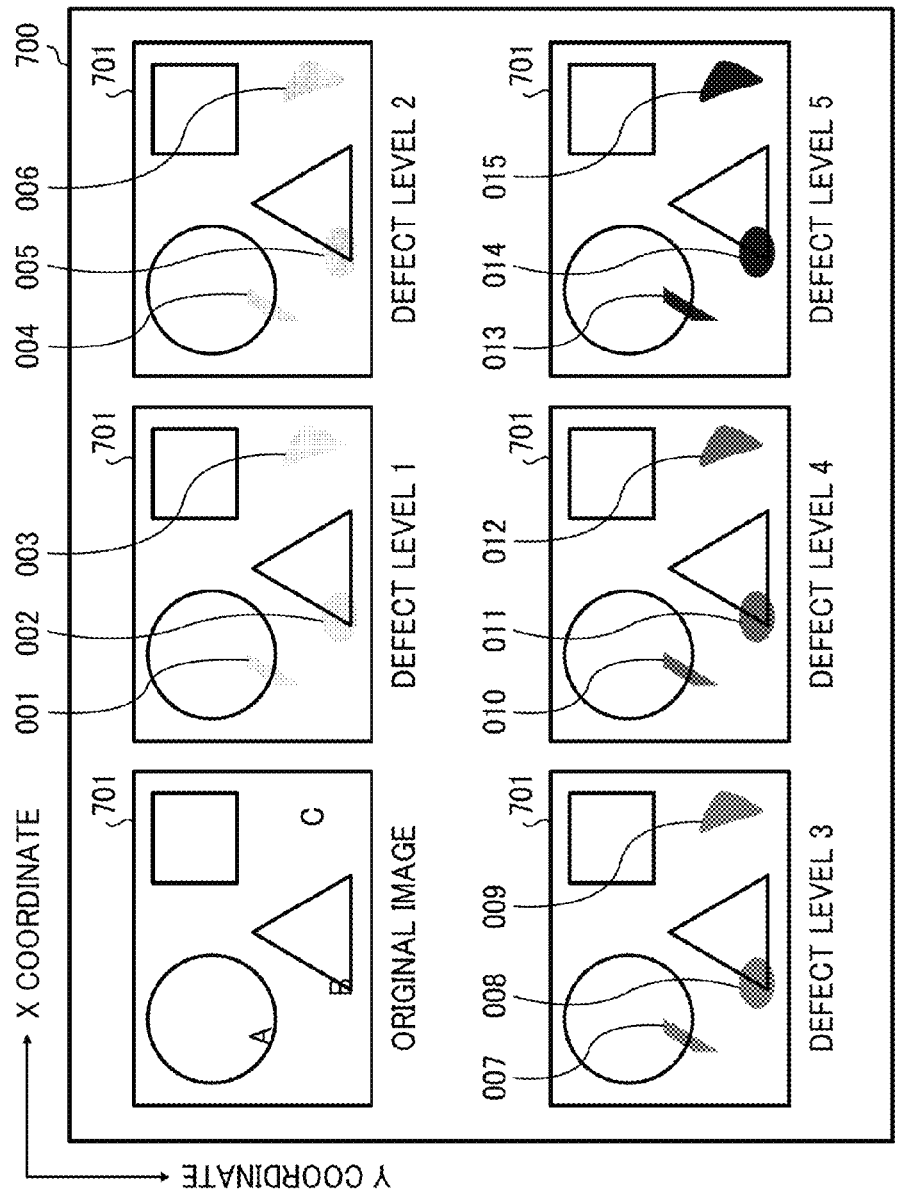

FIG. 9

| DEFECT ID | COORDINATES | DEFECT VALUE |
|---|---|---|
| 001 | $X_{001}, Y_{001}$ | $d_1$ |
| 002 | $X_{002}, Y_{002}$ | $d_1$ |
| 003 | $X_{003}, Y_{003}$ | $d_1$ |
| 004 | $X_{004}, Y_{004}$ | $d_2$ |
| 005 | $X_{005}, Y_{005}$ | $d_2$ |
| 006 | $X_{006}, Y_{006}$ | $d_2$ |
| 007 | $X_{007}, Y_{007}$ | $d_3$ |
| 008 | $X_{008}, Y_{008}$ | $d_3$ |
| ... | ... | ... |

FIG. 10

| DEFECT ID | COORDINATES | DEFECT VALUE | THRESHOLD |
|---|---|---|---|
| 001 | $X_{001}, Y_{001}$ | $d_1$ | $th_{001}$ |
| 002 | $X_{002}, Y_{002}$ | $d_1$ | $th_{002}$ |
| 003 | $X_{003}, Y_{003}$ | $d_1$ | $th_{003}$ |
| 004 | $X_{004}, Y_{004}$ | $d_2$ | $th_{004}$ |
| 005 | $X_{005}, Y_{005}$ | $d_2$ | $th_{005}$ |
| 006 | $X_{006}, Y_{006}$ | $d_2$ | $th_{006}$ |
| 007 | $X_{007}, Y_{007}$ | $d_3$ | $th_{007}$ |
| 008 | $X_{008}, Y_{008}$ | $d_3$ | $th_{008}$ |
| ... | ... | ... | ... |

SCANNED IMAGE　　　　　　　MASTER IMAGE

IMAGE INSPECTION SYSTEM AND IMAGE INSPECTION METHOD FOR DETERMINING A THRESHOLD USEABLE FOR DEFECT DETECTION IN A SCANNED IMAGE BASED UPON A REFERENCE IMAGE WITH AN ARTIFICIAL DEFECT

CROSS-REFERENCE TO RELATED APPLICATION

This application claims priority pursuant to 35 U.S.C. §119 to Japanese Patent Applications No. 2012-171946, filed on Aug. 2, 2012 and No. 2013-151922, filed on Jul. 22, 2013 in the Japan Patent Office, the disclosure of which are incorporated by reference herein in their entirety.

BACKGROUND

1. Technical Field

The present invention relates to an image inspection system and an image inspection method, and more particularly to setting of inspection thresholds used for determining defects of image.

2. Background Art

Conventional inspections of printed matter such as printed papers are conducted by visual inspection, but inspection apparatuses have been introduced to conduct the inspections as a post-processing operation of the offset printing. As for the inspection apparatus, the printed matters are visually inspected by an operator to select a printed matter having satisfactory image quality, and then the selected printed matter is scanned to generate a master image to be used as a reference image. The master image and inspection target printed matter are compared with each other by scanning the inspection target printed matter, and based on difference between the master image and the inspection target, defect of the inspection target printed matter can be determined.

However, the printing apparatuses of digital to press such as image forming apparatuses using electrophotography typically print images with a small volume, and also print different images for each page (i.e. variable printing), in which generating a master image from printed matter as a reference image is not efficient. In this type of image forming apparatuses, the master image can be generated from print data to efficiently conduct the inspection for the variable printing.

In this image inspection process, the defect of printed matter can be determined based on the above mentioned difference level. Specifically, scanned images prepared by scanning sheets printed with images and the master image generated from the print data are compared, in which positions and sizes of comparing images are matched and then the comparing images are compared for each pixel based on a given threshold.

JP-2008-003876-A discloses an image inspection process for an inkjet printer, which can verify inspection precision for the image inspection. Specifically, defects that may likely occur for the inkjet printer are artificially printed on sheets, the sheets having printed with the artificial defects are inspected, and then it is verified whether the inspection can be conducted effectively.

The above mentioned threshold used for comparing the images affect the inspection precision, thereby effective thresholds need to be set for high precision inspection. JP-2008-003876-A discloses a configuration to determine whether the inspection is conducted effectively using thresholds such as thresholds set in advance, in which suitable thresholds are not set automatically.

SUMMARY

In one aspect of the present invention, an image inspection system for inspecting an image output on a recording medium is devised. The image inspection system includes an image forming unit to conduct an image forming operation of a threshold setting image on the recording medium, the threshold setting image prepare-able by adding an artificial defect to an output-target image input to the image forming unit; an image scanner to scan the threshold setting image output on the recording medium to generate a scanned image; an inspection reference image generator to obtain data of the output-target image used by the image forming unit to conduct an image forming operation, and to generate an inspection reference image using the data of the output-target image, the inspection reference image to be used for an inspection of the scanned image; an image inspection unit to determine a defect in the scanned image based on a difference between the inspection reference image and the scanned image; and a threshold determiner to determine a threshold to be compared with a difference between the inspection reference image and the scanned image to determine whether the scanned image includes a defect. The inspection reference image generator generates the inspection reference image of the output-target image for the threshold determination process. The image inspection unit computes the difference between the scanned image, obtained by scanning the threshold setting image, and the inspection reference image for the threshold determination process. The threshold determiner determines a threshold to be compared with the difference between the scanned image and the inspection reference image to determine whether the scanned image includes a defect.

In another aspect of the present invention, an image inspection method for an image inspection system for inspecting an image output on a recording medium is devised. The method includes the steps of obtaining an output-target image input to an image forming apparatus; forming a threshold setting image on the recording medium using the image forming apparatus, the threshold setting image prepare-able by adding an artificial defect to the output-target image; generating an inspection reference image using data of the output-target image; scanning the threshold setting image formed on the recording medium to obtain a scanned image of the threshold setting image; computing a difference between the scanned image and the inspection reference image by comparing the scanned image and the inspection reference image; and determining a threshold based on the difference between the scanned image and the inspection reference image, wherein the threshold is compared with the difference between the scanned image and the inspection reference image to determine whether the scanned image includes a defect.

In another aspect of the present invention, a non-transitory computer-readable carrier medium storing a program that, when executed by a computer, causes the computer to execute a method for an image inspection system for inspecting an image output on a recording medium is devised. The method includes the steps of obtaining an output-target image input to an image forming apparatus; forming a threshold setting image on the recording medium using the image forming apparatus, the threshold setting image prepare-able by adding an artificial defect to the output-target image; generating an inspection reference image using data of the output-target image; scanning the threshold setting image formed on the recording medium to obtain a scanned image of the threshold setting image; computing a difference between the scanned image and the inspection reference image by comparing the scanned image and the inspection reference image; and determining a threshold based on the difference between the scanned image and the inspection reference image, wherein the threshold is compared with the difference between the scanned image and the inspection reference image to determine whether the scanned image includes a defect.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 shows examples of output images used for threshold determination process according to an example embodiment;

FIG. 8 shows an example of setting of artificial defects according to an example embodiment;

FIG. 9 shows an example of defect coordinate information according to an example embodiment;

FIG. 10 shows an example of a computation result of discrete threshold according to an example embodiment;

Figure 1:
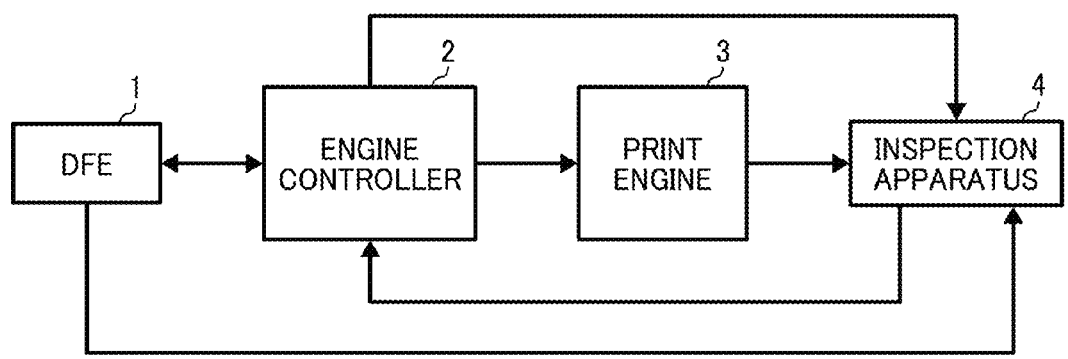
FIG. 1 shows a schematic configuration of an image forming system including an inspection apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter with reference to drawings.

In this disclosure, an image forming system includes an inspection apparatus, in which a master image and an scanned image obtained by scanning an image output by an image forming operation are compared to inspect an output result (e.g., printed image) of the image forming operation, and thresholds used to determine defect level of image, matched to inspection precision desired by a user, can be settable easily and preferably.

FIG. 1 shows an example configuration of an image forming system according to an example embodiment. As shown in FIG. 1, the image forming system includes, for example, a digital front end (DFE) 1, an engine controller 2, a print engine 3 and an inspection apparatus 4. Based on a received print job, the DFE 1 generates bitmap data, which is image data to be output (i.e., output-target image), and outputs the generated bitmap data to the engine controller 2.

Based on the bitmap data received from the DFE 1, the engine controller 2 controls the print engine 3 to conduct an image forming operation. Further, the engine controller 2 transmits the bitmap data received from the DFE 1 to the inspection apparatus 4, wherein the bitmap data is used as data of original information for preparing an inspection reference image to be used for inspection at the inspection apparatus 4 when the inspection apparatus 4 inspects an output result of an image forming operation of the print engine 3.

Under the control of the engine controller 2, the print engine 3 conducts an image forming operation on a recording medium such as paper using the bitmap data, and scans an output paper such as a paper printed with an image using a scanner, and inputs the scanned image data to the inspection apparatus 4. The recording medium can be, for example, sheet such as paper, film, plastic sheet, and any material that can be used to be output with an image by image forming operation. Based on the bitmap data input from the engine controller 2, the inspection apparatus 4 generates a master image. Then, the inspection apparatus 4 compares the scanned image data, input from the print engine 3, and the generated master image to conduct an image inspection of output image, in which the inspection apparatus 4 is used as an image inspection apparatus.

Figure 2:
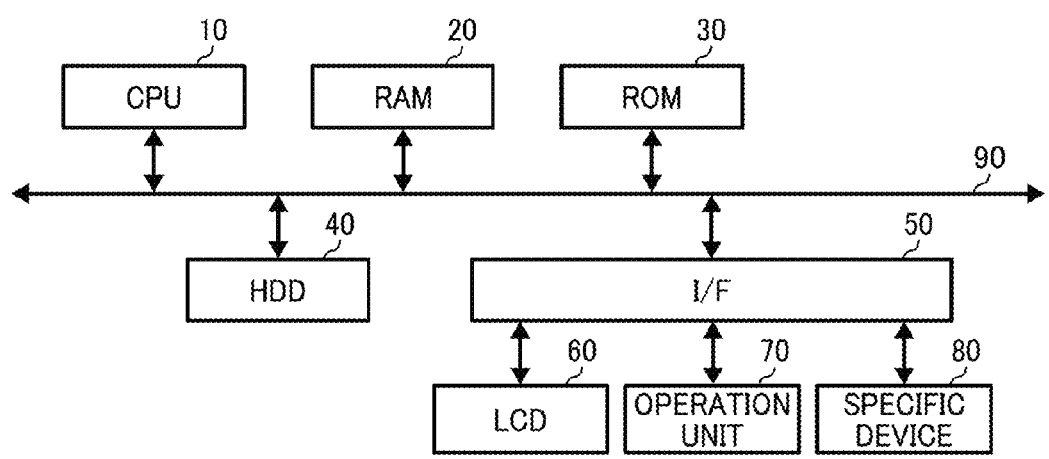
FIG. 2 shows an example block diagram of a hardware configuration of the inspection apparatus according to an example embodiment.

A description is given of a hardware configuration of the engine controller 2, the print engine 3 and the inspection apparatus 4 according to an example embodiment with reference to FIG. 2. Further, as for the inspection apparatus 4, engines for scanner and printer may be added to the hardware configuration shown in FIG. 2. FIG. 2 shows a block diagram of an example hardware configuration of the inspection apparatus 4. The engine controller 2 and the print engine 3 may have a hardware configuration similar to the inspection apparatus 4 shown in FIG. 2.

As shown in FIG. 2, the inspection apparatus 4 can be configured similarly to information processing apparatuses such as general servers, and personal computers (PC), or the like. Specifically, the inspection apparatus 4 includes a central processing unit (CPU) 10, a random access memory (RAM) 20, a read only memory (ROM) 30, a hard disk drive (HDD) 40, and an interface (I/F) 50, connectable to each other via a bus 90. Further, the I/F 50 is connectable to a liquid crystal display (LCD) 60, an operation unit 70, and a specific device 80.

The CPU 10 is a computing processor or unit which controls the inspection apparatus 4 as a whole. The CPU 10 can be configured with various types of processors, circuits, or the like, such as a programmed processor, a circuit, and an application specific integrated circuit (ASIC), used singly or in combination. The RAM 20 is a volatile memory, to which data or information can be written and read at high speed, and is used as a working memory when the CPU 10 processes data or information. The ROM 30 is a non-volatile memory used as a read only memory, and stores programs such as firmware or the like. The HDD 40 is a non-volatile storage device, to and from which data or information can be written and read, and stores operating system (OS), management or control software programs, application software programs, various data, or the like.

The I/F 50 can be used to connect various types of hardware and network to the bus 90, and controls such connection. The LCD 60 is a user interface to display information, with which the status of the inspection apparatus 4 can be checked by a user. The operation unit 70 is a user interface such as a keyboard, a mouse, etc., with which information can be input to the inspection apparatus 4 by the user.

The specific device 80 may be disposed as hardware to conduct a specific capability or function for each of the engine controller 2, the print engine 3 and the inspection apparatus 4. For example, as for the print engine 3, the specific device 80 may be a plotter to conduct an image forming operation on sheets, and a scanner to scan images output on the sheets. Further, as for the engine controller 2 and the inspection apparatus 4, the specific device 80 may be a specific computing circuit to conduct high speed image processing, and the specific device 80 may be, for example, an application specific integrated circuit (ASIC).

In the above hardware configuration, software programs stored in a storage area such as the ROM 30, the HDD 40, or an optical disk can be read and loaded to the RAM 20, and the CPU 10 runs such programs to control various units, with which a software-executing controller can be configured. With a combination of such software-executing controller and hardware, a functional block to operate the engine controller 2, the print engine 3 and the inspection apparatus 4 can be configured. In an example embodiment, at least one of the units is implemented as hardware or as a combination of hardware/software.

Figure 3:
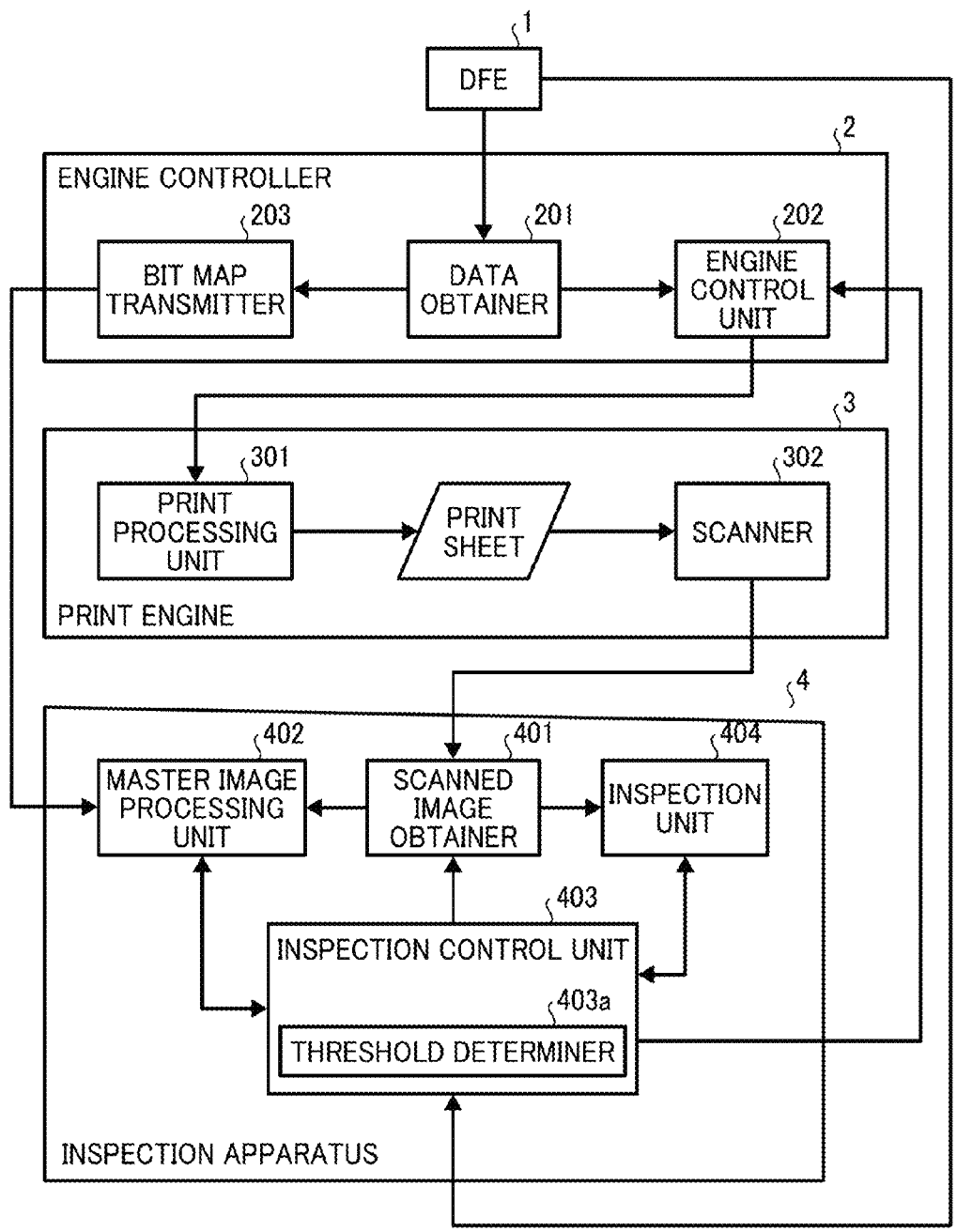
FIG. 3 shows an example block diagram of an engine controller, a print engine and an inspection apparatus according to an example embodiment.

FIG. 3 shows an example block diagram of the engine controller 2, the print engine 3 and the inspection apparatus 4. As shown in FIG. 3, the engine controller 2 includes, for example, a data obtainer 201, an engine control unit 202 and a bitmap transmitter 203. Further, the print engine 3 includes, for example, a print processing unit 301 and a scanner 302. Further, the inspection apparatus 4 includes, for example, a scanned image obtainer 401, a master image processing unit 402, an inspection control unit 403 and an inspection unit 404. The inspection unit 404 can be used as an image inspection unit that compares images for inspection.

Upon obtaining the bitmap data from the DFE 1 by the data obtainer 201, the engine control unit 202 and the bitmap transmitter 203 are operated. The bitmap data is information of pixels composing an image to be output by an image forming operation, and the data obtainer 201 can function as a pixel information obtainer. Based on the bitmap data transferred from the data obtainer 201, the engine control unit 202 instructs the print engine 3 to conduct an image forming operation, in which the engine control unit 202 can function as an output execution control unit. The bitmap transmitter 203 transmits the bitmap data, obtained by the data obtainer 201, to the inspection apparatus 4.

The print processing unit 301 obtains the bitmap data input from the engine controller 2, conducts an image forming operation to a sheet, and outputs a printed sheet. The print processing unit 301 may use an image forming mechanism employing electrophotography.

The scanner 302 scans an image formed on the sheet by conducting a printing operation by the print processing unit 301, and outputs scanned data to the inspection apparatus 4. The scanner 302 is, for example, a line scanner disposed along a transport route of sheet output by the print processing unit 301, in which the scanner 302 scans the transported sheet face to read an image formed on the sheet.

Figure 4:
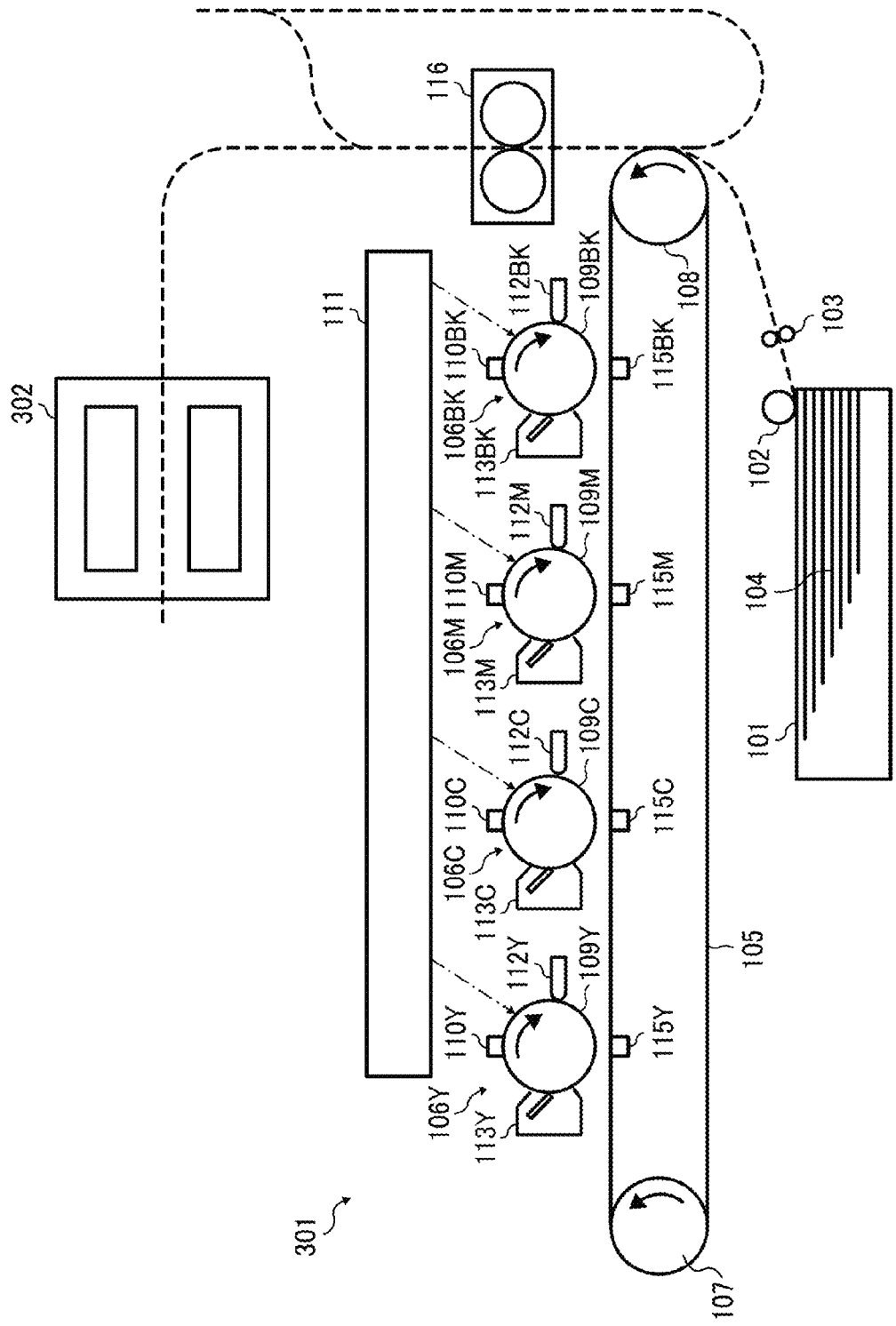
FIG. 4 shows a schematic mechanical configuration of a print processing unit according to an example embodiment.

A description is given of mechanical configurations of the print processing unit 301 and the scanner 302 with reference to FIG. 4. As shown in FIG. 4, the print processing unit 301 includes, for example, image forming units 106BK, 106M, 106C, 106Y and a transport belt 105 of an endless movement unit, in which the image forming units 106BK, 106M, 106C, 106Y are disposed along the transport belt 105, which is referred to as the tandem type. Specifically, the image forming units 106BK, 106M, 106C, 106Y (electrophotography processing units) are disposed along the transport belt 105 from the upstream side of a transport direction of the transport belt 105. An intermediate transfer image is formed on the transport belt 105, and transferred to a recording medium such as a sheet 104, which is separated and fed from a sheet tray 101 using a sheet feed roller 102 and a separation roller 103.

The internal configuration is common for the image forming units 106BK, 106M, 106C, 106Y except color of toner image, which means the image forming unit 106BK forms black image, the image forming unit 106M forms magenta image, the image forming unit 106C forms cyan image, and the image forming unit 106Y forms yellow image. Hereinafter, the image forming unit 106BK is described as the representative of the image forming units 106BK 106M, 106C, 106Y. Each members composing the image forming units 106BK 106M, 106C, 106Y may be attached with BK, M, C, Y as required.

The transport belt 105 is an endless belt extended by a drive roller 107 and a driven roller 108. The drive roller 107 can be rotated by a drive motor. The drive motor, the drive roller 107 and the driven roller 108 can be collectively function as a drive unit for the transport belt 105 which is the endless movement unit.

When forming images, the image forming unit 106BK transfers black toner image to the rotating transport belt 105. The image forming unit 106BK includes, for example, a photoconductor drum 109BK used as a photoconductor, a charger 110BK disposed near the photoconductor drum 109BK, a development unit 112BK, a photoconductor cleaner, and a decharger 113BK. Further, an optical writing unit 111 irradiates light for each of the photoconductor drums 109BK, 109M, 109C, 109Y (hereinafter, photoconductor drum 109).

When forming images, an outer face of the photoconductor drum 109BK is charged uniformly by the charger 110BK in a dark environment, and then an electrostatic latent image for black image is formed on the photoconductor drum 109BK by irradiating light from a light source for black image in the optical writing unit 111. The development unit 112BK develops the electrostatic latent image using black toner, and then black toner image is formed on the photoconductor drum 109BK.

The black toner image is transferred to the transport belt 105 at a transfer position of the photoconductor drum 109BK and the transport belt 105 by a transfer unit 115BK, in which the photoconductor drum 109BK and the transport belt 105 may contact or be the closest with each other. With this transfer, the black toner image is formed on the transport belt 105. Upon completing the transfer of black toner image, the photoconductor cleaner removes toner remaining on the outer face of the photoconductor drum 109BK, and then the photoconductor drum 109BK is decharged by the decharger 113BK to prepare for a next image forming operation.

The transport belt 105 transferred with the black toner image by the image forming unit 106BK is transported to the image forming unit 106M, next to the image forming unit 106B, by rotating the transport belt 105. Similar to the image forming process at the image forming unit 106BK, the image forming unit 106M forms magenta toner image on the photoconductor drum 109M, and the magenta toner image may be superimposed and transferred on the black toner image.

The transport belt 105 having the transferred black toner image and magenta toner image is then transported to the image forming units 106C, 106Y. Similar to the image forming unit 106BK, cyan toner image formed on the photoconductor drum 109C, and yellow toner image formed on the photoconductor drum 109Y may be superimposed and transferred on the black toner image and magenta toner image, with which the intermediate transfer image of full color is formed on the transport belt 105.

The sheet 104 stacked in the sheet tray 101 is fed from the top sheet, and the intermediate transfer image formed on the transport belt 105 is transferred on the sheet 104 at a transfer position that the transport belt 105 and the sheet 104 contact or be the closest with each other in the transport route, with which an image is formed on the sheet 104. The sheet 104 formed with the image is transported to a fusing unit 116 to fuse the image on the sheet 104, and then ejected from the image forming apparatus.

In the fusing unit 116, the toner image transferred on the sheet 104 is fused by heat, in which water included in the sheet 104 is vaporized when the sheet 104 is passing through the high temperature fusing unit 116, with which the sheet 104 shrinks and thereby the image size on the sheet 104 may become smaller than the image size of original image. When the scanner 302 scans the shrink sheet 104, the scanned image smaller than the original image may be generated.

Further, when the duplex printing is conducted, the sheet 104 having the fused image is transported to an inverting route to invert the faces of the sheet 104, and then the sheet 104 is transported to the transfer position again. The sheet 104 having the fused image on one face or both faces is transported to the scanner 302. Then, the scanner 302 scans one face or both faces, with which a scanned image, which is an inspection target image, is generated.

A description is given of the inspection apparatus 4 by referring FIG. 3 again. The scanned image obtainer 401 obtains the scanned image data generated by scanning the sheet face by the scanner 302 in the print engine 3, and inputs the scanned image data as an inspection target image to the inspection unit 404. As described above, the master image processing unit 402 obtains the bitmap data input from the engine controller 2, and generates a master image as an inspection reference image to be compared with the inspection target image. Therefore, based on the output-target image, the master image processing unit 402 is used as an inspection reference image generator that generates the master image as the inspection reference image to be used for inspecting the scanned images. The generation process of master image by the master image processing unit 402 will be described later.

The inspection control unit 403 controls the inspection apparatus 4 as a whole, and thereby each unit in the inspection apparatus 4 is operated under the control of the inspection control unit 403. Further, in an example embodiment, the inspection control unit 403 includes a threshold determiner 403a. The inspection unit 404 is used as an image inspection unit that compares the scanned image data, input from the scanned image obtainer 401, and the master image, generated by the master image processing unit 402, to determine whether a desired image forming operation is conducted. The inspection unit 404 may be configured with the above mentioned ASIC or the like to compute a great amount of data with high speed processing.

Figure 5:
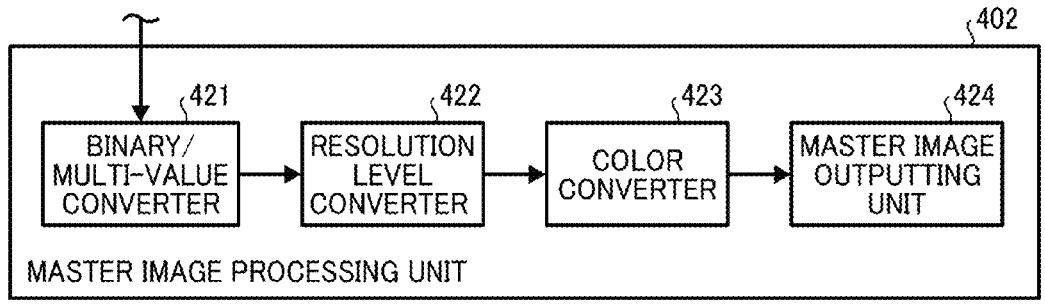
FIG. 5 shows an example block diagram of master image processing unit according to an example embodiment.

A description is given of the master image processing unit 402 with reference to FIG. 5. FIG. 5 shows an example block diagram of the master image processing unit 402. As shown in FIG. 5, the master image processing unit 402 includes, for example, a binary/multi-value converter 421, a resolution level converter 422, a color converter 423 and a master image outputting unit 424. The master image processing unit 402 can be devised as the specific device 80 (see FIG. 2) devised by a combination of hardware and software such as the ASIC controlled by software.

The binary/multi-value converter 421 conducts a binary/multi-value converting process to a binary format image expressed binary such as color/non-color to generate a multi-valued image. The bitmap data is information input to the print engine 3. The print engine 3 conducts an image forming operation based on binary format image for each color of cyan, magenta, yellow, black (CMYK). Because the scanned image data, which is the inspection target image, is a multi-valued image composed of multi-gradient image of the three primary colors of red, green and blue (RGB), a binary format image is initially converted to a multi-valued image by the binary/multi-value converter 421. The multi-valued image is, for example, an image expressed by 8-bit for each CMYK.

Further, the print engine 3 conducts an image forming operation based on binary format image for each of CMYK, and the master image processing unit 402 includes the binary/multi-value converter 421 but not limited hereto. For example, when the print engine 3 conducts an image forming operation based on multi-valued image, the binary/multi-value converter 421 can be omitted.

The resolution level converter 422 conducts a resolution level conversion process to match a resolution level of multi-valued image generated by the binary/multi-value converter 421 to a resolution level of the scanned image data (i.e., inspection target image). Because the scanner 302 generates scanned image data, for example, with the resolution level of 200 dots per inch (dpi), the resolution level converter 422 converts a resolution level of multi-valued image generated by the binary/multi-value converter 421 to 200 dpi.

The color converter 423 obtains the image having converted with the resolution level by the resolution level converter 422 and conducts a color converting process. Because the scanned image data is RGB-format image as described above, the color converter 423 converts the CMYK-format image having converted with the resolution level by the resolution level converter 422 to the RGB-format image, with which a multi-valued image of 200 dpi expressed with 8-bit for each of RGB (total 24 bits) for each pixel is generated.

The master image outputting unit 424 outputs the master image, generated by using the binary/multi-value converter 421, the resolution level converter 422 and the color converter 423, to the inspection control unit 403. Based on the master image obtained from the master image processing unit 402, the inspection control unit 403 instructs the inspection unit 404 to conduct an image comparing process to obtain a comparison result.

The inspection unit 404 compares the scanned image data and the master image expressed with 8-bit for each of RGB (total 24 bits) as described above for each corresponding pixel, and computes difference of pixel values for each of RGB for each pixel. Based on the comparison of the computed difference and a threshold, the inspection unit 404 determines whether a defect occurs to the scanned image data. Therefore, the inspection unit 404 can function as an image inspection unit to determine defect of the scanned image data based on difference of the inspection reference image and the scanned image data. Further, the difference computed for each of pixels can be correlated for each of pixel positions and can be configured as a differential image.

Further, the difference and the threshold can be compared by the inspection unit 404 as follows. For example, difference values computed for each of pixels are summed for a given area of an image as a total value, and the total value is compared with the threshold, which is set to be compared with the total value. The given area for summing the difference values of each of pixels is, for example, a 20-dot square area. In an example embodiment, therefore, the threshold is a value set for the total difference value of the given area (hereinafter, defect determination unit area) obtained by summing the difference values. Therefore, the inspection unit 404 outputs position information of the defect determination unit area on an image having a total difference value exceeding the threshold, wherein this position information can be used as information indicating the presence of defect in the scanned image data. The position information in the image is defined by, for example, coordinate information on image.

Figure 16:
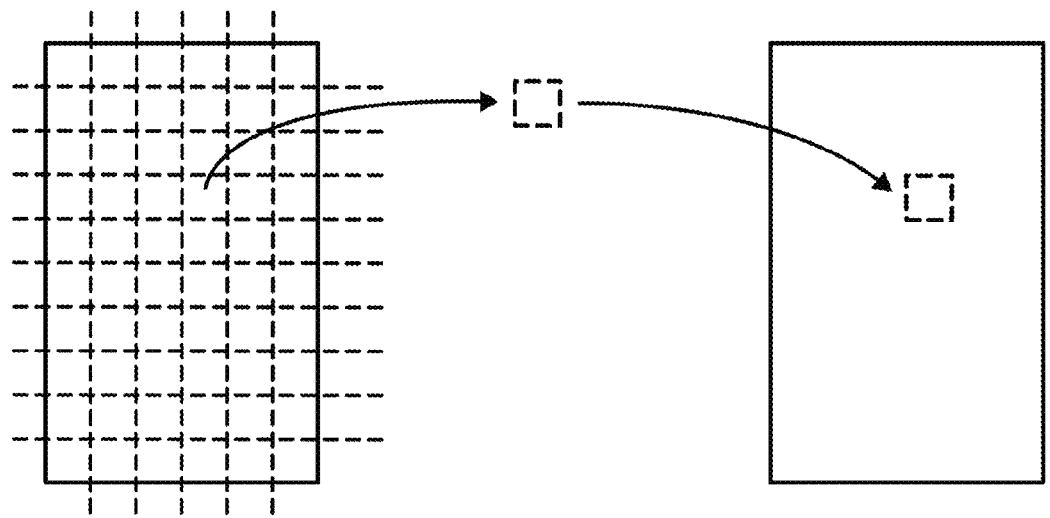
FIG. 16 schematically shows a process of comparing images for inspection according to an example embodiment.

When comparing the scanned image and the master image, the scanned image is divided into a plurality of areas as shown in FIG. 16. The inspection unit 404 superimposes each divided area to a corresponding area of the master image to compute a difference of pixel value of each pixel such as difference of density. Further, a position of superimposing the divided area to the master image is shifted left/right and up/down to determine a position that the computed difference becomes the smallest and the smallest difference is used as a comparison result. Each one of the divided areas shown in FIG. 16 can be used as the above described defect determination unit area.

Figure 17:
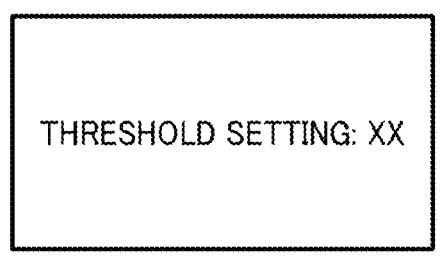
FIG. 17 schematically shows an example of threshold setting according to an example embodiment.

Further, the above described thresholds are given as register setting for the inspection unit 404 configured as ASIC. The inspection control unit 403, which is configured by executing a program by the CPU 10, writes a threshold, set as shown in FIG. 17, to the register provided to designate a threshold for the inspection unit 404, with which the above described threshold can be set.

In the system according to an example embodiment, when setting thresholds used for the image comparing process by the inspection unit 404, thresholds matched to inspection precision, which may be desired by a user, can be set easily, and therefore, the inspection control unit 403 includes the threshold determiner 403a to determine the above mentioned threshold using each unit of the inspection apparatus 4. A description is given of a process of setting the threshold with reference to FIG. 6.

Figure 6:
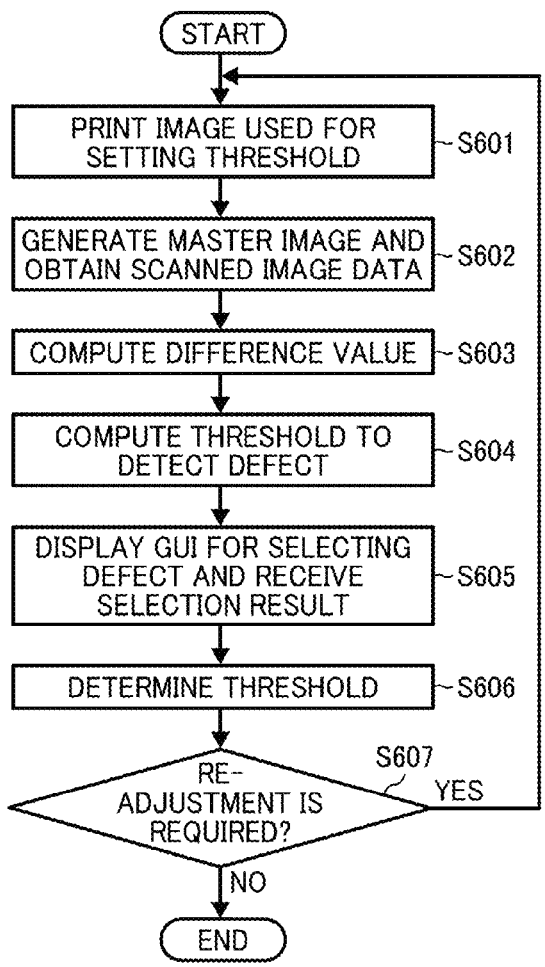
FIG. 6 is a flowchart of process of a threshold determination process according to an example embodiment.

FIG. 6 is a flowchart of process of setting threshold according to an example embodiment. As shown in FIG. 6, when setting the threshold, under the control of the engine controller 2, the print engine 3 conducts a printing operation for images used for setting thresholds (hereinafter, referred to as threshold setting image) (S601). Specifically, the engine controller 2 generates the threshold setting image by adding an artificial defect on an original image input by a user (hereinafter, original image). FIG. 7 shows examples of threshold setting image 700.

In an example embodiment, as shown in FIG. 7, the threshold setting image 700 can be prepared based on an original image 701, which may include a plurality of images arranged with a given pattern, and the original image 701 can be arranged a plurality of numbers as shown in FIG. 7. A left-top image of FIG. 7 includes a plurality of images as the original image, and given position identifiers A, B and C are assigned to the image. Defect-added images can be prepared by adding artificial images to the assigned positions indicated by the position identifiers A, B and C. As shown in FIG. 7, defect-added images can be prepared by adding defects having different levels such as defect level 1, defect level 2 and so on to the original image. FIG. 8 shows an example of a table indicating a relationship of defect level and defect value for each defect level, wherein the defect value indicates a level of defect. The defect value such as $d_1$, $d_2$ shown in FIG. 8 indicates, for example, density of each defect indicated by references such as 001, 002 in FIG. 7, which is a pixel value.

Figure 18:
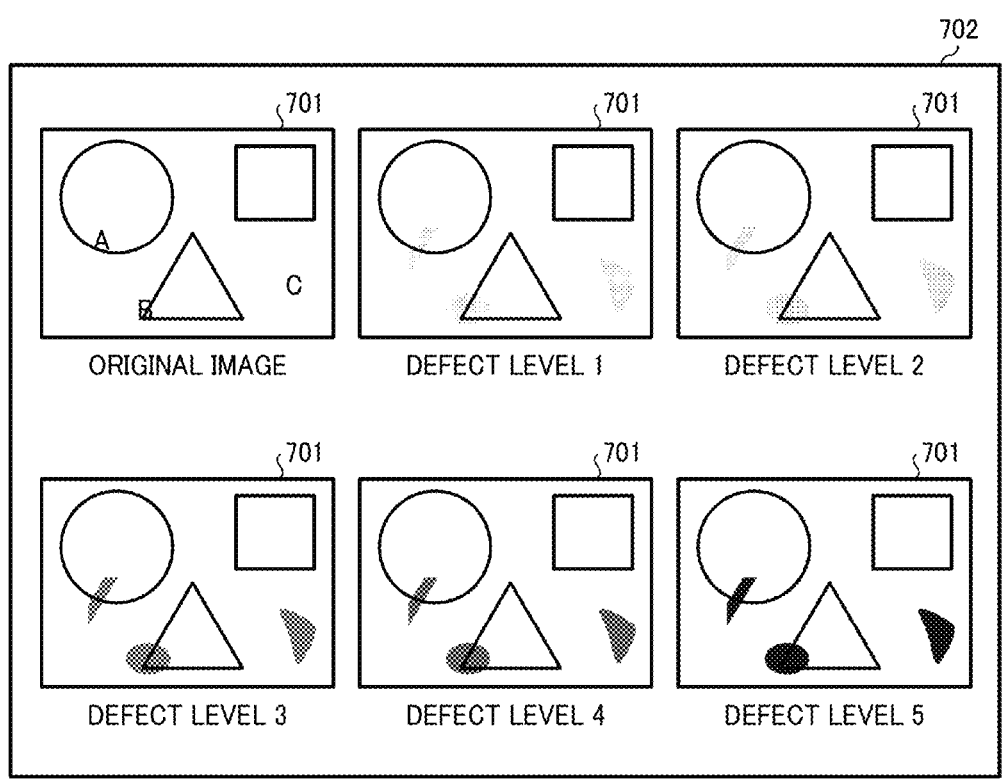
FIG. 18 shows an original image corresponded to threshold setting image shown in FIG. 7.

When preparing the images shown in FIG. 7, a user may input the above mentioned original image to the DFE 1 by operating the operation unit 70 connected to the DFE 1 and designate the position identifiers A, B and C shown in FIG. 7 to the original image displayed on a display unit such as the LCD 60 connected to the DFE 1. Upon obtaining the original images, the DFE 1 arranges the plurality of images used as the original image on the screen as shown in FIG. 7, and the DFE 1 inputs the bitmap data of the original image to the engine controller 201 at first. With this processing, the data obtainer 201 obtains image data including only the original images arranged on the screen as shown as in FIG. 7, which means the data obtainer 201 obtains bitmap data of image that the position identifiers are not superimposed with artificial defects. Hereinafter, an image not superimposed with artificial defects is simply referred to as the original image, wherein the original image may include a plurality of images as shown in FIG. 7. FIG. 18 shows an original image 702 corresponded to the threshold setting image 700 shown in FIG. 7.

Then, for the images having set with the original image shown in FIG. 7, the DFE 1 superimposes the position identifiers A, B and C in one image (e.g., a left-top image) at the positions selected by a user's operation. Then, the DFE 1 superimposes artificial defects, corresponding to defect values shown in FIG. 8 to the positions selected by the user's operation on other images as shown in FIG. 7, with which bitmap data for the images used for setting thresholds (i.e., threshold setting image) can be generated. Then, the DFE 1 inputs the generated threshold setting images to the engine controller 2, with which the data obtainer 201 can obtain bitmap data of the threshold setting images shown in FIG. 7.

Further, at S601, as for each of defects added to the original image, the DFE 1 generates information (hereinafter, "defect coordinate information") correlating defect-added positions and defect values of added defects, and transmits the defect coordinate information to the inspection control unit 403. FIG. 9 shows an example of defect coordinate information according to an example embodiment. As shown in FIG. 9, the defect coordinate information includes the defect identification (ID) to identify each one of defects, coordinates indicating positions of each of artificial defects added to the original image, and defect values indicating the defect level of one of defects, which are correlated one to another. Further, the defect ID shown in FIG. 9 corresponds to each reference such as 001, 002 shown in FIG. 7. Further, the coordinates shown in FIG. 9 indicates positions with respect to an entire image indicated by coordinate axis shown in FIG. 7 but not the positions in each of discrete image.

Further, as shown in FIG. 8, the defect value can be changed such as $d_1$, $d_2$, $d_3$ and so on depending on the defect levels. In an example case shown in FIGS. 7 and 8, the greater the value of "n" of $d_n$, the greater the density, which means as the defect level becomes high, the density of the added artificial defects becomes thick. In other words, the defect value indicates the density of image added as artificial defect.

When adding defects having different defect levels as shown in FIG. 7, the engine control unit 202 obtains settings for a range of changing levels of defects, and determines the value of $d_n$ shown in FIG. 8 based on the obtained settings for the range. The settings for the range may values set for the engine control unit 202 in advance or set manually by a user when outputting the threshold setting image 700 shown in FIG. 7.

The $d_n$ can be obtained using the following formula (1) by setting the lower limit $d_m$ and the upper limit $d_M$ for the settings for the range.

$$d_n = d_m + \frac{1}{4}(d_M - d_m) \times n \quad (1)$$

Based on the computation by the above formula (1), the range of from $d_m$ to $d_M$ can be divided equally by five values of $d_1$ to $d_5$, and can be used as the defect values.

FIG. 7 shows an example case reproducing defects by toner adhesion, in which defects having different densities corresponding to each defect level are added on the original image, but the defect is not limited to the toner adhesion. For example, the defect may be a defect size, which can be changed depending on defect levels. Further, the types of reproduced defect may be a stripe pattern of toner adhesion, in which the defect may be reproduced by changing the density as described above and/or changing a width of stripe. Further, by contrast to the toner adhesion, the defect may be incomplete transfer of toner such as drop of color, in which the defect may be reproduced as drop of color for the shapes shown in FIG. 7, and the drop of color for stripe pattern may be reproduced as defect image, and the size and width of defect can be changed depending on the defect levels.

As for the above mentioned various types of defect, the contents of defect to be added depending on the defect levels can be determined using the above described settings of $d_m$ and $d_M$ and the formula (1). If the defects are prepared by changing the density as shown in FIG. 7, the $d_n$ is set with a pixel value indicating density of image. Further, if the defects are prepared by changing the size, the $d_n$ is set with values indicating size. Further, if the defects are prepared by changing the width, the $d_n$ is set with values indicating the width.

In the process at S601, the engine controller 2, the print engine 3 and the inspection apparatus 4 respectively conduct the above described operations, in which the engine controller 2 transmits the bitmap data to the inspection apparatus 4, and the scanned image data, generated in the print engine 3 by scanning the output sheet, is input to the inspection apparatus 4. Therefore, in S601, the DFE 1, the engine controller 2 and the print processing unit 301 of the print engine 3 can collectively function as an image forming unit.

As described above, because the DFE 1 inputs bitmap data of the original image, arranged with a plurality of numbers as shown in FIG. 7, and the images used for setting thresholds (i.e., threshold setting image) to the data obtainer 201, if the engine control unit 202 is operated normally, the engine control unit 202 conducts an image forming operation for both of the original image and the images used for the threshold setting image. However, only the threshold setting images are required for generating the scanned image data whereas the original image is used for generating the master image. Therefore, the engine control unit 202 can cancel the image forming operation of the original image.

When setting the thresholds, the inspection apparatus 4 generates the master image based on the bitmap data input from the engine controller 2, and obtains the scanned image data input from the scanner 302 (S602). In S602, when the two bitmap data are input from the engine controller 2 (i.e., the original image and the threshold setting image), the inspection control unit 403 controls the master image processing unit 402 to generate the master image only for the original image. The master image is used as the inspection reference image as described above. The master image is also referred to as a normal reference image used for inspection, and the normal reference image is used as the inspection reference image for the above described setting threshold image.

Further, as for the two types of image data input from the print engine 3 (i.e., scanned image of the original image and scanned image of the threshold setting image), the inspection control unit 403 controls the scanned image obtainer 401 to discard the scanned image data of the original image and obtains the scanned image data of the threshold setting image, which is the defect-scanned image data. Further, the inspection control unit 403 controls the inspection unit 404 to conduct the image comparing process for the master image of the original image, and the scanned image data of the threshold setting image, and computes the difference as described above to obtain a differential image (S603).

Upon obtaining the differential image for the threshold setting image with respect to the master image, as explained with reference to FIGS. 7 and 9, the threshold determiner 403a of the inspection control unit 403 computes a threshold to detect each defect added to the original image, prepared as the threshold setting image as defect, in which the threshold setting image can prepared by adding artificial defects to the original image and added artificial defects can be defected as defect (S604).

In S604, as shown in FIG. 10, the thresholds such as $th_{oo1}$, $th_{oo2}$ and so on can be computed for each defect ID registered in the defect coordinate information received from the DFE 1. In S604, based on the difference value generated for each one of a plurality of artificial defects having different levels, a threshold to be used for determining each one of the plurality of artificial defects as defect can be computed, and the each computed threshold is referred to as discrete threshold.

Figure 11:
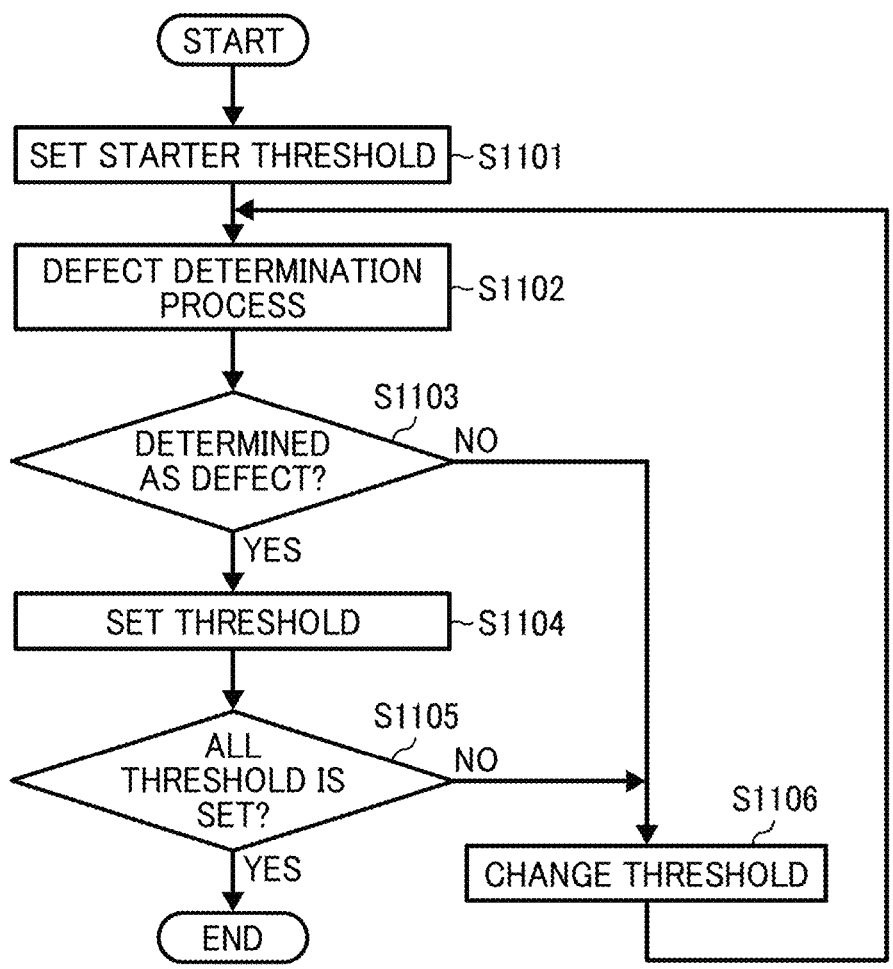
FIG. 11 is a flowchart of process of computing discrete threshold according to an example embodiment.

A description is given of a process of S604 (FIG. 6) with reference to FIG. 11. As shown in FIG. 11, the threshold determiner 403a of the inspection control unit 403 sets a starter threshold (S1101) at first. The starter threshold is a threshold that any types of defect are not extracted as defect, which means that even if a total difference value for the defect determination unit area is great, a value greater than the total difference value for the defect determination unit area is set as the starter threshold, with which no defect is determined as defect.

Upon setting the starter threshold, the threshold determiner 403a controls the inspection unit 404 to conduct a defect determination process based on the starter threshold (S1102). In S1102, as described above, a defect determination process is conducted for the whole image by conducting the defect determination process for each one of the defect determination unit areas, in which the total difference value and the threshold are compared for each one of the defect determination unit areas to determine whether each one of the defect determination unit areas includes a defect. Then, the threshold determiner 403a refers to the coordinates information registered in the defect coordinate information obtained from the DFE 1, and compares the coordinates of the defect determination unit area determined as the defect and the coordinates registered in the defect coordinate information, with which it can be determined which defect is determined as defect.

If any one of defects can be determined as current defect based on the determination result of S1102 (S1103: YES), the threshold determiner 403a registers a currently-used threshold as a threshold for the current defect determined as defect based on the determination result of S1102 in the table shown in FIG. 10 (S1104). With this processing, each discrete threshold such as $th_{oo1}$, $th_{oo2}$ and so on shown in FIG. 10 can be registered. Further, in the process of S1102 and S1103, the position identifiers A, B and C shown in FIG. 7 may be determined as defects, but the defect coordinate information shown in FIG. 9 is not registered with coordinates of the position identifiers, and thereby threshold is not registered for the position identifiers A, B, and C.

Upon completing S1104, the threshold determiner 403a checks whether a threshold is set for all of defects (S1105). If the threshold is set for all of defects (S1105: YES) as shown in FIG. 10, the process ends. By contrast, if no defect is determined as current defect (S1103: NO) when S1102 is conducted, or if the threshold is not yet set for all of defects (S1105: NO), the threshold determiner 403a changes a value of the threshold to increase the probability to be determined as defect (S1106), and repeats the process from S1102.

In an example embodiment, the threshold determiner 403a changes values of threshold gradually to increase the probability to be determined as defect, and repeats the defect determination process until all of defects are determined as defect. With this processing, thresholds matched to an actual defect determination process can be determined based on thresholds used for extracting various artificial defects having different levels. Further, in an example embodiment, because the defects can be determined based on the scanned image data generated by the scanner 302, thresholds matched to the images scanned real time by the scanner 302 can be set.

Figure 12A:
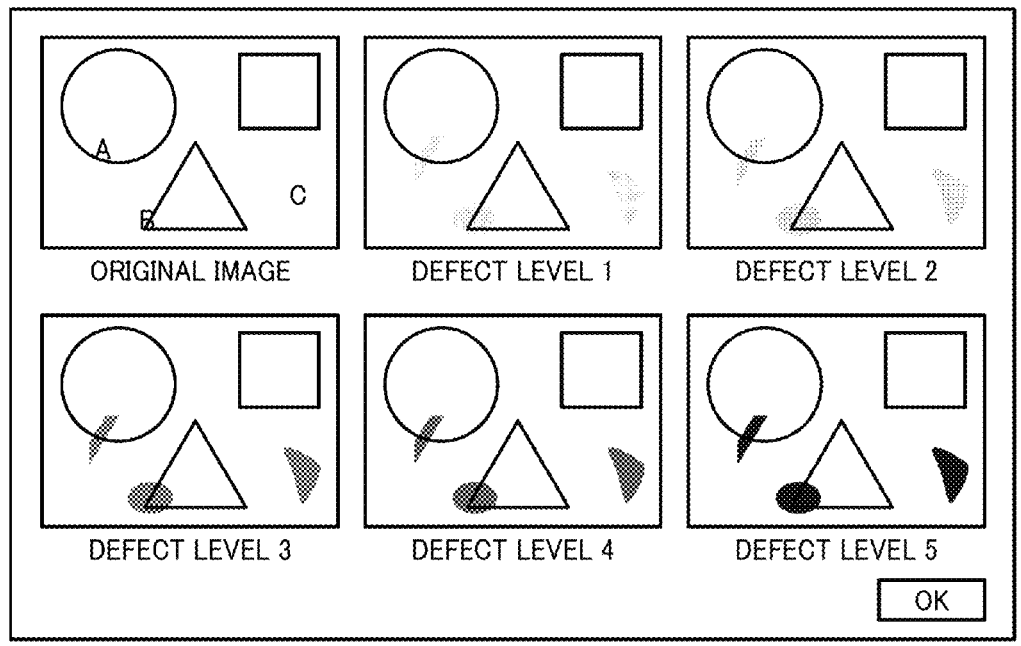
FIGS. 12A and 12B show examples of threshold selection screens according to an example embodiment.
Figure 12B:
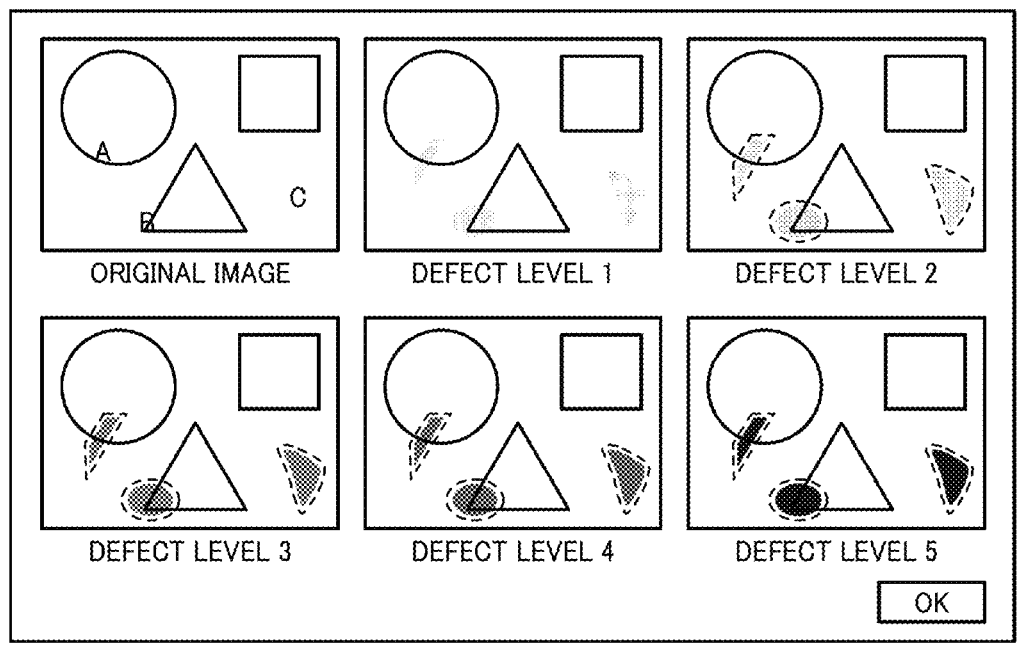

Upon completing the process of S604, the inspection control unit 403 controls a display unit to display a graphical user interface (GUI), which is used by a user to set a threshold, and the inspection control unit 403 receives a selection result based on a user's operation (S605). The GUI displayed in S605 is referred to as a threshold selection screen hereinafter, and FIGS. 12A and 12B show examples of threshold selection screens. The threshold selection screens shown in FIGS. 12A and 12B can be displayed on a display unit such as the LCD 60 connected to the inspection apparatus 4. FIG. 12A shows an initial screen of GUI displayed in S605, which means a screen before a user's selection operation.

As shown in FIG. 12A, the threshold selection screen displays the threshold setting images described with reference to FIG. 7. The images shown in FIG. 12 can be displayed using, for example, the scanned image data for the threshold setting image obtained by the scanned image obtainer 401. The user can select one or more defects to be identified as defect on the screen shown in FIG. 12A.

When selecting the defect on the screen shown in FIG. 12A, the user operates the screen, but the defect is selected by looking the output sheet (i.e., not selected on the screen), in which the user can determine the defect based on the defect actually output on the sheet. FIG. 12B shows an example screen that images to be identified as defect are selected by the user. As shown in FIG. 12B, the defect selected by the user can be displayed on the screen with high-lighted condition such as encircling frame.

When the defect is selected as described above, the threshold determiner 403a can set a threshold to detect each defect as defect by referring the table shown in FIG. 10. Specifically, upon receiving the user's selection at S605, the threshold determiner 403a extracts a discrete threshold, corresponded to the defect selected by the user as shown in FIG. 12B, from the table shown in FIG. 10.

Specifically, when the defect is selected as shown in FIG. 12B, the threshold determiner 403a obtains coordinate information on the image depending on the selected position and refers coordinates information in the table of FIG. 10 based on the obtained coordinates information. Then, from the table of FIG. 10, the threshold determiner 403a extracts information of threshold correlated to the information of coordinates closest to the position of the selected position.

Upon extracting the discrete threshold for the selected defect (FIG. 12B) from the table of FIG. 10, the threshold determiner 403a determines a finally-set threshold based on the extracted discrete thresholds (S606). In S606, among the extracted discrete thresholds corresponding to the defects selected by the user as to-be-determined as defect, the inspection control unit 403 determines one of the discrete thresholds as the finally-set threshold, in which a discrete threshold having the strictest threshold is determined as the finally-set threshold. When the finally-set threshold is set as the threshold, the greater number defect can be determined as defect. The threshold determined with this process is stored as threshold setting as shown in FIG. 17, and when the inspection unit 404 conducts an inspection by comparing images, a threshold can be given to the inspection unit 404 by writing the threshold as a register value by the inspection control unit 403.

Upon determining the finally-set threshold, the inspection control unit 403 determines whether re-adjustment is required based on the user's operation (S607). In S607, the inspection control unit 403 controls a display unit such as the LCD 60 connected to the inspection apparatus 4 to display a screen for selecting whether the re-adjustment is required, and determines whether the re-adjustment is required based on the user's operation to the screen.

If the re-adjustment is not required (S607: NO), the inspection control unit 403 ends the process. By contrast, if the re-adjustment is required (S607: YES), the inspection control unit 403 instructs the DFE 1 to repeat the steps from S601 and controls the inspection apparatus 4, in which as described above, the inspection control unit 403 designates a range of changing the density and/or width for the threshold setting image. Specifically, the inspection control unit 403 can designate the $d_n$ for the defect having the maximum value $d_M$ and the minimum value $d_m$ for each discrete threshold extracted at S605.

As described above, the $d_n$, computed for each defect can be stored in the DFE 1. Therefore, the inspection control unit 403 can designate the $d_n$, to the DFE 1 by only notifying the defect ID of defect corresponding to the above mentioned maximum value and the minimum value.

When the process of S601 is to be conducted again, an image forming operation of the threshold setting image, added with artificial defects corresponding to the maximum value and the minimum value of the discrete threshold already extracted by the process at S605 by conducting the threshold setting process, is to be conducted. By conducting the process of FIG. 6 for the threshold setting image, the threshold can be set more precisely.

In the system of an example embodiment, as shown in FIG. 7, defects having changed defect levels step-wisely are added to an image by the user, and the defect determination is conducted by changing the thresholds step-wisely, with which discrete threshold that can detect each of defects having step-wisely changed defect levels can be obtained.

Then, the user checks sheets printed with given image patterns with eyes to select a defect to be determined as defect and a defect to be determined not as defect (i.e., allowable level defect), and determines the finally-set threshold based on the discrete thresholds corresponded to the selected defects. With this processing, when the image inspection is conducted based on a comparison result obtained by comparing the image generated by scanning an image output by an image forming operation and the master image, the setting of threshold used for determining the defect can be conducted easily and preferably based on the comparison result.

Figure 13:
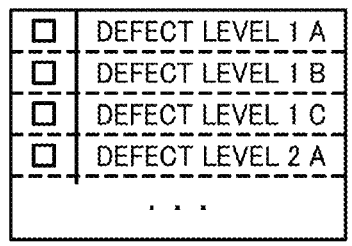
FIG. 13 shows another example of threshold selection screen according to an example embodiment.

Further, in the above described example embodiment, as shown in FIGS. 12A and 12B, a plurality of images can be displayed on the screen from which a user can select defects intuitively based on visual information displayed on the screen, but not limited hereto. For example, a user can select defects from a list shown in FIG. 13, wherein the list includes defect identification information identifying defects based on defect identifiers and defect levels of added defect such as defect level 1 for A.

Further, in the above described example embodiment, as shown in FIGS. 7 and 12A/12B, a plurality of threshold setting images are arranged and displayed on the screen with a given order corresponding to the levels of artificial defects, with which a user can easily select an allowable defect in view of the level of artificial defects. Further, by arranging a plurality of threshold setting images randomly (i.e., not arranged with a given order), a user can select defects without preconception.

Further, FIG. 7 shows an example that the density of defect changes depending on the defect levels, but the types of defect is not limited hereto. Various types of defect can be used when a user conducts defect determination by selecting defects. For example, types of defect presented to the user may be defect in colors when the user selects whether defect determination is to be conducted. Because of human perception on colors may differ for each person, the level of artificial defects that can be allowed or not for each color may be different for each person.

For example, as for a relatively pale color such as Y, a user may allow the defect level of $d_4$ shown in FIG. 8 (i.e., only defect $d_5$ is selected as to-be-determined defect) while other color such as K, the user may select the defect levels from $d_1$ to $d_5$ (i.e., all of defects shown in FIG. 8) as the to-be-determined defect. In this case, a threshold set for the defect level of $d_1$ becomes the strictest value. If this strictest value is applied, the defect of Y that the user may determine as allowable may be determined as defect.

In this case, the inspection unit 404 can set thresholds step-wisely to enhance the user's convenience. Specifically, the finally set threshold may include a first threshold and a second threshold, in which the first threshold is set to determine defect without a confirmation of a user, and the second threshold is set to determine defect or not based on a selection of a user.

This configuration can be devised, for example, as follows. Specifically, when generating information shown in FIG. 9, the DFE 1 can prepare information indicating color defect by correlating defect information for each of defects such as information of single color of C, M, Y, K and information of combinations of C, M, Y, K. With this processing, the inspection control unit 403 determines a threshold for each one of defects at S604 (FIG. 6) and generates the table shown in FIG. 10, with which each threshold can be correlated with information of single color of C, M, Y, K and information of combinations of C, M, Y, K.

Then, at S605 (FIG. 6), when the inspection control unit 403 extracts the strictest threshold value from the selected thresholds, the inspection control unit 403 refers to color information correlated to each defect, and extracts a threshold for each of colors. Then, among the thresholds extracted for each of colors, the inspection control unit 403 sets a value having a broadest allowable range as the first threshold, with which a smaller number of defects are determined as defect, and sets the strictest value as the second threshold, with which a greater number of defects are determined as defect.

In this processing, if a defect is determined as defect even if the threshold having the broadest allowable range is applied, a user may detect the same defect as defect by visual confirmation with a higher probability, thereby the defect can be determined as defect without the confirmation by the user. Further, if a defect is determined as defect when the threshold having the narrowest allowable range is applied, it is not clear whether user may detect the same defect as defect by visual confirmation, thereby the defect can be determined as defect based on the confirmation by the user, with which the defect determination precision can be enhanced.

Further, when the setting of threshold is conducted repeatedly as explained with reference for S607 (FIG. 6), the inspection control unit 403 can designate the values of $d_n$ corresponding to the first and second thresholds using $d_m$ and $d_M$.

Further, in the above described example embodiment, as explained with reference to FIG. 12A/12B and S605 (FIG. 6), upon the visual confirmation of artificial defects by the user, the defect is selected, with which the inspection apparatus 4 can determine the finally-set threshold based on the threshold corresponding to the selected defect. With this configuration, the allowable level of defect determination can be set easily based on the user's visual confirmation.

Further, even without the user's selection operation, the threshold can be set based on a difference value between a normal image such as the above described original image and an image added with artificial defect such as the threshold setting image shown in FIG. 7, with which the threshold corresponded to the condition of the scanner 302 can be set. Therefore, by omitting the process of S605 (FIG. 6), the threshold can be set automatically based on a difference value between the master image generated as the normal image and the scanned image data of the image added with artificial defect.

Further, in the above described example embodiment, as explained with reference to FIG. 7, the threshold setting images are generated by adding the defects from $d_m$ to $d_M$ corresponding to each defect level at positions selected by the user in the original image. Instead, the DFE 1 can be used to determine positions to be added with each types of to-be-added defect based on an analysis of image contents.

For example, in an example case of FIG. 7, if a defect caused by toner adhesion is added to a thick color area in the original image, the toner adhesion defect may not be so prominent, and thereby a user may determine the toner adhesion defect is allowable. In this case, even if the defect is a thick defect corresponding to defect level 5 in FIG. 7, the difference value computed by the process of S603 (FIG. 6) becomes small, and thereby artificial defects corresponding to each of the defect levels may not be detected effectively. Therefore, when generating the threshold setting image for the toner adhesion defects shown in FIG. 7, the DFE 1 analyzes the input original image, and preferably selects a thin color area in the original image as a position for adding defects.

Further, if a defect is not the toner adhesion defect, but is a defect caused by drop of color, the following may occur. If the drop of color defect is added to a thin color area or a white area in the original image, the change from the original image is small, and the difference value computed by the process of S603 (FIG. 6) becomes small, and thereby artificial defects corresponding to the defect levels may not be detected effectively. Therefore, when generating the threshold setting image adding the drop of color defect in the original image, the DFE 1 analyzes the input original image, and preferably selects a thick color area in the original image as a position for adding the drop of color defect.

Further, if the user selects a position in the original image as described above, the DFE 1 can determine the types of to be added defects based on the selection result. For example, if the selected position in the original image is a thin color area, the DFE 1 selects a defect of toner adhesion of irregular shape or stripe shape shown in FIG. 7. Further, if the selected position in the original image is a thick color area, the DFE 1 selects the drop of color defect of irregular shape or stripe shape. With this processing, effective artificial defects can be added at the selected positions.

As described above, when generating the threshold setting image using the DFE 1, the DFE 1 can determine adding conditions of artificial defect such as a position adding defect and an adding defect contents based on density information of each of pixels composing the input original image, with which effective artificial defect can be added to the original image in view of the contents of original image.

Further, in the above example embodiment, as shown in FIG. 1, the DFE 1, the engine controller 2, the print engine 3 and the inspection apparatus 4 are used as separate apparatuses with each other. The DFE 1, the engine controller 2 and the print engine 3 shown in FIG. 1 can be included in image forming apparatuses such as printers, which are not image forming apparatuses for commercial printing machines such as production printers.

Figure 14A:
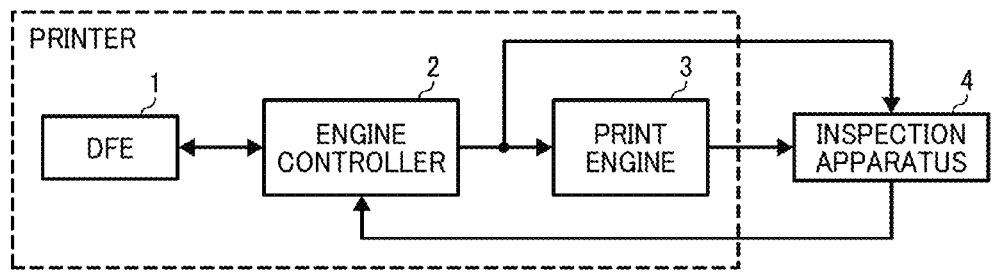
FIGS. 14A and 14B show schematic configurations of systems according to another example embodiment.
Figure 14B:
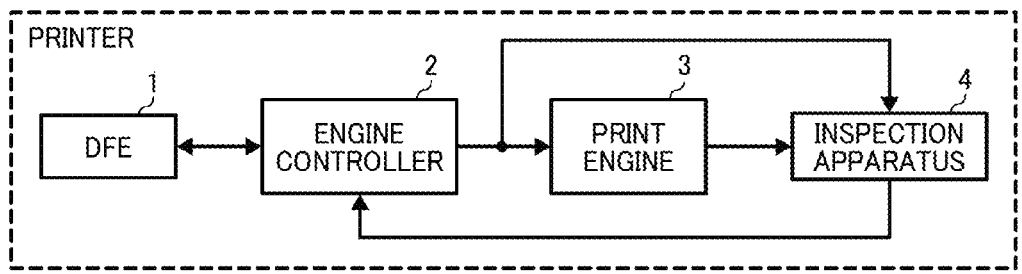

For example, as shown in FIG. 14A, the inspection apparatus 4 can be connected to a printer having the DFE 1, the engine controller 2 and the print engine 3. Further, as shown in FIG. 14B, a printer having the DFE 1, the engine controller 2, the print engine 3 and the inspection apparatus 4 can be configured as one printer.

Further, in the above example embodiment, the DFE 1, the engine controller 2, the print engine 3 and the inspection apparatus 4 are connected with each other via a local interface such as universal serial bus (USB), peripheral component interconnect express (PCIe) or the like to configure one system. However, the inspection apparatus 4 is not required to be placed at the same site of the DFE 1, the engine controller 2 and the print engine 3, but the inspection apparatus 4 can be provided as an application for the system, for example, via a network.

Figure 15:
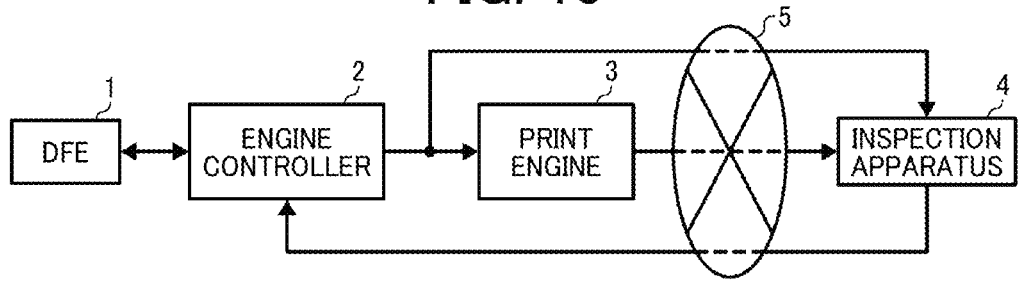
FIG. 15 shows a schematic configuration of a system according to another example embodiment.

FIG. 15 shows one example configuration that the function of the inspection apparatus 4 can be provided via a network, in which the engine controller 2 and the print engine 3 may be connected to the inspection apparatus 4 via a public line 5 such as the Internet. The engine controller 2 and the print engine 3 can transmit information to the inspection apparatus 4 via the public line 5. Further, the inspection apparatus 4 can transmit an inspection result to the engine controller 2 via the public line 5. In this configuration, the inspection apparatus 4 is not required to be disposed at a user site, with which an initial cost of the user can be reduced.

Further, in the configuration shown in FIG. 15, the user cannot control the inspection apparatus 4 directly because the function of the inspection apparatus 4 is provided via the network. In this configuration, the screens shown in FIGS. 12A/12B and FIG. 13 and other screens for controlling the inspection apparatus 4 can be displayed on an information processing apparatus such as a personal computer (PC) connected to the network via a web browser, with which the user can use the system similar to the above example embodiment.

Further, in the above example embodiments, the original image, arranged with a plurality of numbers, is formed on the same sheet, but the plurality of the original images can be formed on different sheets.

Further, in the above example embodiment, the levels of artificial defect is changed by changing the defect density and/or defect size (e.g., width of defect), but not limited thereto. For example, other parameters of image can be used and changed as required. Further, in the above example embodiment, each parameter is changed separately, but parameters can be changed with combinations.

In the above described example embodiment, an image inspection is conducted by comparing images obtained by scanning images output by an image forming operation and a master image, and based on a comparison result, thresholds to determine defects can be set easily and preferably.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on.

Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image inspection system, the image inspection system comprising:
    an image forming unit to form an image on a recording medium based on an output-target image;
    an image scanner to scan the image formed on the recording medium to generate a scanned image;
    an inspection reference image generator to generate an inspection reference image to be used for an inspection of the scanned image based on the output-target image;
    a computing unit to compute a difference between the inspection reference image and the scanned image;
    an image inspection unit to determine a defect in the scanned image based on a comparison between the difference computed by the computing unit and a threshold,
    wherein the image forming unit is configured to form a threshold setting image on a recording medium, the threshold setting image being prepare-able by adding an artificial defect to an original image,
    wherein the image scanner is configured to scan the threshold setting image to generate a scanned image including a defect,
    wherein the inspection reference image generator is configured to generate a normal inspection reference image based on the original image, and
    wherein the computing unit is configured to compute the difference between the scanned image including the defect and the normal inspection reference image; and
    a threshold determiner to determine the threshold based on a difference between the scanned image including the defect and the normal inspection reference image.

2. The image inspection system of claim 1, wherein the image forming unit is configured to add a plurality of different defect patterns to the original image, to generate information indicating position added with each one of the plurality of defect patterns in the original image, and to output the position information,
    wherein the image inspection unit is configured to determine a defect for each divided area, by dividing the scanned image including the defect into a given number of areas, using a plurality of different discrete thresholds,
    wherein when one of the divided areas is determined to include a defect in the scanned image including the defect, the threshold determiner registers a discrete threshold used for determining the defect by correlating the discrete threshold with a defect corresponding to the position of the divided area determined as the defect among information indicating each position added with each one of the plurality of defects, and
    wherein the threshold determiner is configured to determine a threshold to be compared with the difference based on the registered discrete threshold correlated with selected defect among the plurality of defects.

3. The image inspection system of claim 2, wherein the threshold determiner is configured to output display information for displaying a selection screen used for selecting the plurality of defect patterns, and is configured to recognize a defect selected by an operation to the selection screen.

4. The image inspection system of claim 3, wherein the threshold determiner is configured to output display information for displaying a selection screen by randomly arranging the plurality of different defect patterns.

5. The image inspection system of claim 1, wherein the image forming unit is configured to determine a type of the defect based on information of density for each pixel composing the original image.

6. The image inspection system of claim 5, wherein the image forming unit is configured to determine a position of the determined type of defect on the image based on information of density for each pixel composing the original image.

7. The image inspection system of claim 5, wherein the image forming unit is configured to determine contents of the determined type of defect based on information of density of pixels composing a selected area among pixels composing the original image.

8. An image inspection method, the method comprising:
forming an image on a recording medium based on an output-target image using an image forming unit;
scanning the image formed on the recording medium to generate a scanned image using an image scanner;
generating an inspection reference image, to be used for an inspection of the scanned image, based on the output-target image;
computing a difference between the scanned image and the inspection reference image;
determining a defect in the scanned image based on a comparison between the difference computed by the computing unit and a threshold;
forming a threshold setting image on a recording medium, the threshold setting image being prepare-able by adding an artificial defect to an original image;
scanning the threshold setting image to generate a scanned image including a defect;
generating a normal inspection reference image based on the original image; and
computing the difference between the scanned image including the defect and the normal inspection reference image,
wherein the threshold is determined based on the difference between the scanned image including the defect and the normal inspection reference image.

9. The image inspection method of claim 8,
wherein a plurality of different defect patterns are added to the original image, information indicating position added with each one of the plurality of defect patterns in the original image is generated, and the position information is outputted,
wherein a defect is determined for each divided area, by dividing the scanned image including the defect into a given number of areas, using a plurality of different discrete thresholds,
wherein when one of the divided areas is determined to include a defect in the scanned image including the defect, a discrete threshold, used for determining the defect, is determined by correlating the discrete threshold with a defect corresponding to the position of the divided area determined as the defect among information indicating each position added with each one of the plurality of defects, and
wherein a threshold, to be compared with the difference, is determined based on the registered discrete threshold correlated with selected defect among the plurality of defects.

10. The image inspection method of claim 9, wherein display information is output for displaying a selection screen used for selecting the plurality of defect patterns, and a defect selected by an operation to the selection screen is recognized.

11. The image inspection method of claim 10, wherein display information is output for displaying a selection screen by randomly arranging the plurality of different defect patterns.

12. The image inspection method of claim 8, wherein a type of the defect is determined based on information of density for each pixel composing the original image.

13. The image inspection method of claim 8, wherein a position of the determined type of defect on the image is determined, based on information of density for each pixel composing the original image.

14. The image inspection method of claim 8, wherein contents of the determined type of defect are determined, based on information of density of pixels composing a selected area among pixels composing the input original image.

15. A non-transitory computer-readable carrier medium storing a program that, when executed by a computer, causes the computer to execute a method for an image inspection system for inspecting an image output on a recording medium, the method comprising:
forming an image on a recording medium based on an output-target image using an image forming unit;
scanning the image formed on the recording medium to generate a scanned image using an image scanner;
generating an inspection reference image, to be used for an inspection of the scanned image, based on the output-target image;
computing a difference between the scanned image and the inspection reference image
determining a defect in the scanned image based on a comparison between the difference computed by the computing unit and a threshold;
forming a threshold setting image on a recording medium, the threshold setting image being prepare-able by adding an artificial defect to an original image;
scanning the threshold setting image to generate a scanned image including a defect;
generating a normal inspection reference image based on the original image; and
computing the difference between the scanned image including the defect and the normal inspection reference image,
wherein the threshold is determined based on the difference between the scanned image including the defect and the normal inspection reference image.

* * * * *